(12) United States Patent
Williams et al.

(10) Patent No.: US 8,137,092 B2
(45) Date of Patent: Mar. 20, 2012

(54) SUPPORT ASSEMBLY FOR AN EXTRUDER

(76) Inventors: Edward Williams, St. Louis, MO (US); Alan Eugene Kirkland, Crystal City, MO (US)

( * ) Notice: Subject to any disclaimer, the term of this patent is extended or adjusted under 35 U.S.C. 154(b) by 972 days.

(21) Appl. No.: 12/125,521

(22) Filed: May 22, 2008

(65) Prior Publication Data

US 2009/0291159 A1    Nov. 26, 2009

(51) Int. Cl.
B29C 47/08    (2006.01)

(52) U.S. Cl. ................................. 425/186; 425/192 R

(58) Field of Classification Search .................. 425/185, 425/186, 192 R; 366/331, 79
See application file for complete search history.

(56) References Cited

U.S. PATENT DOCUMENTS

| | | | | |
|---|---|---|---|---|
| 1,447,766 A * | 3/1923 | De Vignier | ...................... | 29/252 |
| 2,315,393 A * | 3/1943 | Bowerman | ...................... | 82/152 |
| 2,820,618 A | 1/1958 | Bolling | | |
| 3,061,914 A * | 11/1962 | Johnston | ......................... | 29/234 |
| 3,408,694 A * | 11/1968 | Matsuoka | ...................... | 425/186 |
| 3,825,387 A * | 7/1974 | Gilman | .......................... | 425/182 |
| 3,913,893 A * | 10/1975 | Scherping | ...................... | 366/289 |
| 4,004,766 A * | 1/1977 | Long | ................................. | 248/55 |
| 4,004,787 A * | 1/1977 | Ellwood et al. | .................. | 366/75 |
| 4,056,207 A * | 11/1977 | Spilker | ........................... | 414/620 |
| 4,234,298 A * | 11/1980 | Spielhoff | ........................ | 425/186 |
| 4,310,251 A | 1/1982 | Scharer et al. | | |
| 4,361,081 A | 11/1982 | Howard | | |
| 4,384,395 A * | 5/1983 | Gietman et al. | ................. | 29/234 |
| 4,588,365 A * | 5/1986 | Holzschuh | .................... | 425/183 |
| 4,615,664 A * | 10/1986 | Kolossow | ...................... | 425/4 C |
| 4,680,002 A * | 7/1987 | Hehl | ............................... | 425/186 |
| 4,711,011 A * | 12/1987 | Nugier | ........................... | 29/239 |
| 4,750,841 A * | 6/1988 | Hicks | ............................... | 366/79 |
| 4,754,539 A * | 7/1988 | Knoll et al. | ................. | 29/893.31 |
| 4,778,370 A * | 10/1988 | Heindl et al. | .................. | 425/190 |
| 4,839,955 A * | 6/1989 | Vannier | ....................... | 29/402.08 |
| 4,889,479 A * | 12/1989 | Hehl | ............................... | 425/185 |
| 4,960,601 A * | 10/1990 | Cummins | ...................... | 426/504 |
| 5,020,914 A * | 6/1991 | Wurl et al. | ....................... | 366/79 |
| 5,031,297 A * | 7/1991 | Nelson | ............................ | 29/446 |
| 5,208,049 A * | 5/1993 | Hatfield et al. | ............... | 425/185 |
| 5,391,070 A * | 2/1995 | Ito et al. | ........................ | 425/135 |
| 5,498,380 A * | 3/1996 | Sasaki | .............................. | 264/39 |
| 5,526,566 A * | 6/1996 | Mosher | ........................... | 29/889 |
| 6,081,983 A * | 7/2000 | Hodgson et al. | ............. | 29/426.3 |
| 6,086,353 A | 7/2000 | Klaus | | |

(Continued)

*Primary Examiner* — Tony G SooHoo
(74) *Attorney, Agent, or Firm* — Storm LLP; Paul V. Storm

(57) ABSTRACT

A modular base is provided. A plurality of motor support members are secured to one another by a first linking member. Each motor support member has a mounting surface that is adapted to be secured to a motor, and the first linking member has a central axis and is dimensioned to support the motor. A plurality of extruder support members are secured to one another by a second linking member. Each extruder support member has a carriage that is adapted to be secured to an extruder, wherein the second linking member has a central axis and is dimensioned to support the extruder. An intermediate member having a mounting surface that is adapted to be secured to a transmission is provided. The intermediate member is secured to one of motor support members by the first linking member and secured to one of the extruder support members by the second linking member, wherein the central axes of the first and second linking members displaced from one another at a distance that enables the transmission to transfer mechanical work from motor to the extruder.

14 Claims, 5 Drawing Sheets

U.S. PATENT DOCUMENTS

| | | |
|---|---|---|
| 6,164,811 A | 12/2000 | Planeta et al. |
| RE38,315 E * | 11/2003 | Hodgson et al. ............... 29/822 |
| 6,805,479 B1 * | 10/2004 | Chszaniecki ................ 366/79 |
| 6,827,477 B2 | 12/2004 | Chszaniecki |
| 7,052,645 B2 * | 5/2006 | Kessler ..................... 264/543 |
| 7,473,087 B2 * | 1/2009 | Steiner ..................... 425/135 |
| 7,997,355 B2 * | 8/2011 | Vuyk et al. ................. 175/206 |
| 2006/0040010 A1 * | 2/2006 | Steiner ..................... 425/192 R |
| 2007/0035067 A1 * | 2/2007 | Ujma et al. ............... 264/328.18 |
| 2008/0061461 A1 * | 3/2008 | Loen ......................... 264/40.1 |
| 2009/0291159 A1 * | 11/2009 | Williams et al. ............. 425/88 |

* cited by examiner

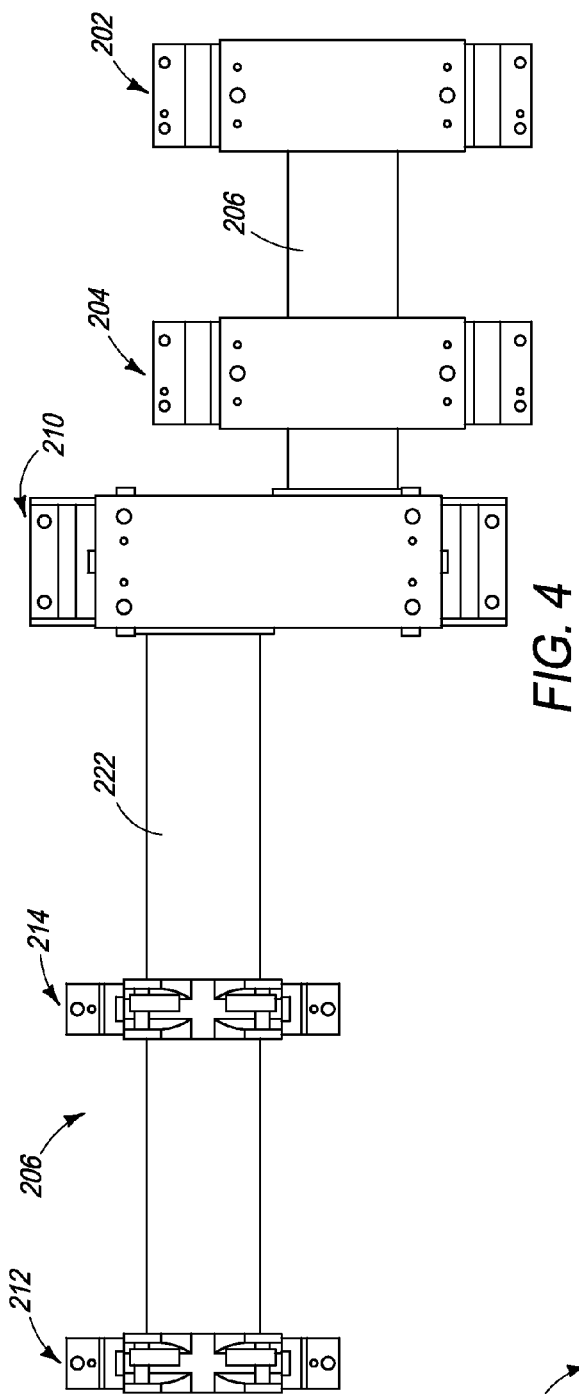
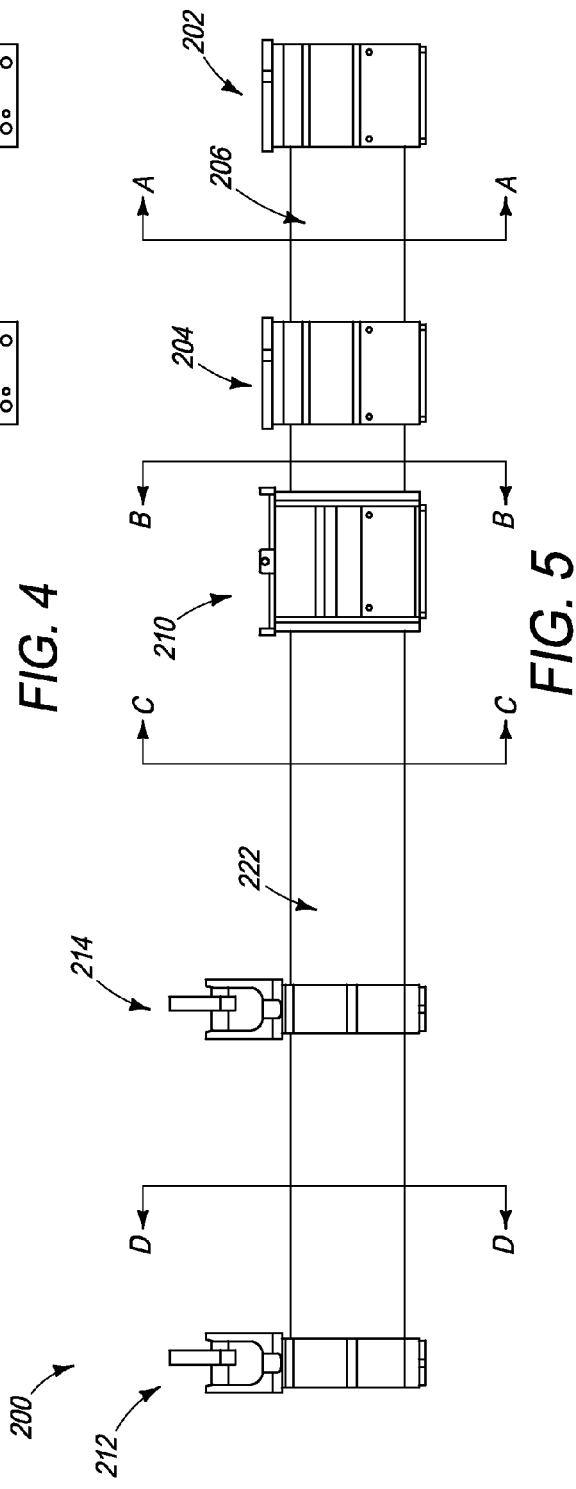

The invention relates generally to an extruder assembly and, more particularly, to a modular base for supporting an extruder assembly.

SUPPORT ASSEMBLY FOR AN EXTRUDER

TECHNICAL FIELD

The invention relates generally to an extruder assembly and, more particularly, to a modular base for supporting an extruder assembly.

BACKGROUND

Extruder assemblies are typically comprised of a motor (or engine) to power the extruder assembly, an extruder, and a transmission or gearbox to transfer power from the motor to the extruder. Each motor, transmission, and extruder is different size, shape, and so forth. So the conventional solution of supporting the extruder assembly is to design a specific base for each particular assembly, which is neither cost effective nor efficient. Some examples of conventional supports are depicted in U.S. Pat. Nos. 2,820,618; 4,004,787; 4,310,251; 4,361,081; 6,086,353; 6,164,811; and 6,827,477.

SUMMARY

In accordance with a preferred embodiment of the present invention, an apparatus for supporting an extruder assembly is provided. The apparatus includes a fixed motor support member having a mounting surface, where the mounting surface of the fixed motor support member supporting at least a portion of a motor. An intermediate support member having a mounting surface is also provided, where the mounting surface of the intermediate support member supporting at least a portion of a transmission that is in mechanic communication with the motor. A first linking member having a first end and an opposite second end is provided, where the first linking member being secured at its first end to the fixed motor support member and at its second end to the intermediate support member. A movable motor support member having a mounting surface is provided, the mounting surface of the movable motor support member supporting at least a portion of the motor. The movable motor support member is also located between the fixed motor support member and the intermediate member, and wherein the movable motor support member movably engages the first linking member. A fixed extruder support member having a mounting surface is also provided, where the mounting surface supporting at least a portion of an extruder that is in mechanical communication with the transmission. A second linking member having a first end and an opposite second end is provided, where the second linking member being secured at its first end to the fixed extruder support member, and where the second linking member being secured at its second end to the intermediate support member. A movable extruder support member having a mounting surface is provided, where the mounting surface of the movable extruder support member supporting at least a portion of the extruder. Additionally, the movable extruder support member being located between the fixed motor support member and the intermediate support member, and the extruder support member movably engages the second linking member.

In accordance with another preferred embodiment of the present invention, the first and second linking members are generally cylindrical.

In accordance with another preferred embodiment of the present invention, the first and second linking members each have a central axis.

In accordance with another preferred embodiment of the present invention, the central axis of the first linking member is spaced apart from the central axis of the second linking member.

In accordance with another preferred embodiment of the present invention, the fixed motor support member and the movable support member have a generally trapezoidal vertical cross-section.

In accordance with another preferred embodiment of the present invention, the intermediate support member has a generally trapezoidal vertical cross-section.

In accordance with another preferred embodiment of the present invention, the fixed extruder support member and the movable extruder support member further comprise a lower member having a top surface and a generally trapezoidal cross-section, wherein the lower member engages the second linking member, and a carriage secured to the top surface of the lower member, the carriage having arms that are adapted to engage the extruder.

In accordance with another preferred embodiment of the present invention, an assembly is provided. A supply member having an extrudate disposed therein is provided. An extruder is in fluid communication with the supply member and generates a flow of the extrudate. A transmission is coupled between the extruder and a motor. A fixed motor support member having a mounting surface supports at least a portion of the motor. An intermediate support member having a mounting surface supports at least a portion of the transmission. A first linking member having a first end and an opposite second end is secured at its first end to the fixed motor support member at its second end to the intermediate support member. A movable motor support member having a mounting surface supports at least a portion of the motor, wherein the movable motor support member is located between the fixed motor support member and the intermediate member, and wherein the movable motor support member movably engages the first linking member. A fixed extruder support member having a mounting surface supports at least a portion of the extruder. A second linking member having a first end and an opposite second end is secured at its first end to the fixed extruder support member and is secured at its second end to the intermediate member. A movable extruder support member having a mounting surface supports at least a portion of the extruder, wherein the movable extruder support member being located between the fixed motor support member and the intermediate support member, and wherein the extruder support member movably engages the second linking member.

In accordance with another preferred embodiment of the present invention, a modular base is provided. A plurality of motor support members are secured to one another by a first linking member. Each motor support member has a mounting surface that is adapted to be secured to a motor, and the first linking member has a central axis and is dimensioned to support the motor. A plurality of extruder support members are secured to one another by a second linking member. Each extruder support member has a carriage that is adapted to be secured to an extruder, wherein the second linking member has a central axis and is dimensioned to support the extruder. An intermediate member having a mounting surface that is adapted to be secured to a transmission is provided. The intermediate member is secured to one of motor support members by the first linking member and secured to one of the extruder support members by the second linking member, wherein the central axes of the first and second linking members displaced from one another at a distance that enables the transmission to transfer mechanical work from motor to the extruder.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a top view of the support base of FIG. 2;

FIG. 5 is a side elevation view of the support base of FIG. 2;

DETAILED DESCRIPTION

Figure 1:
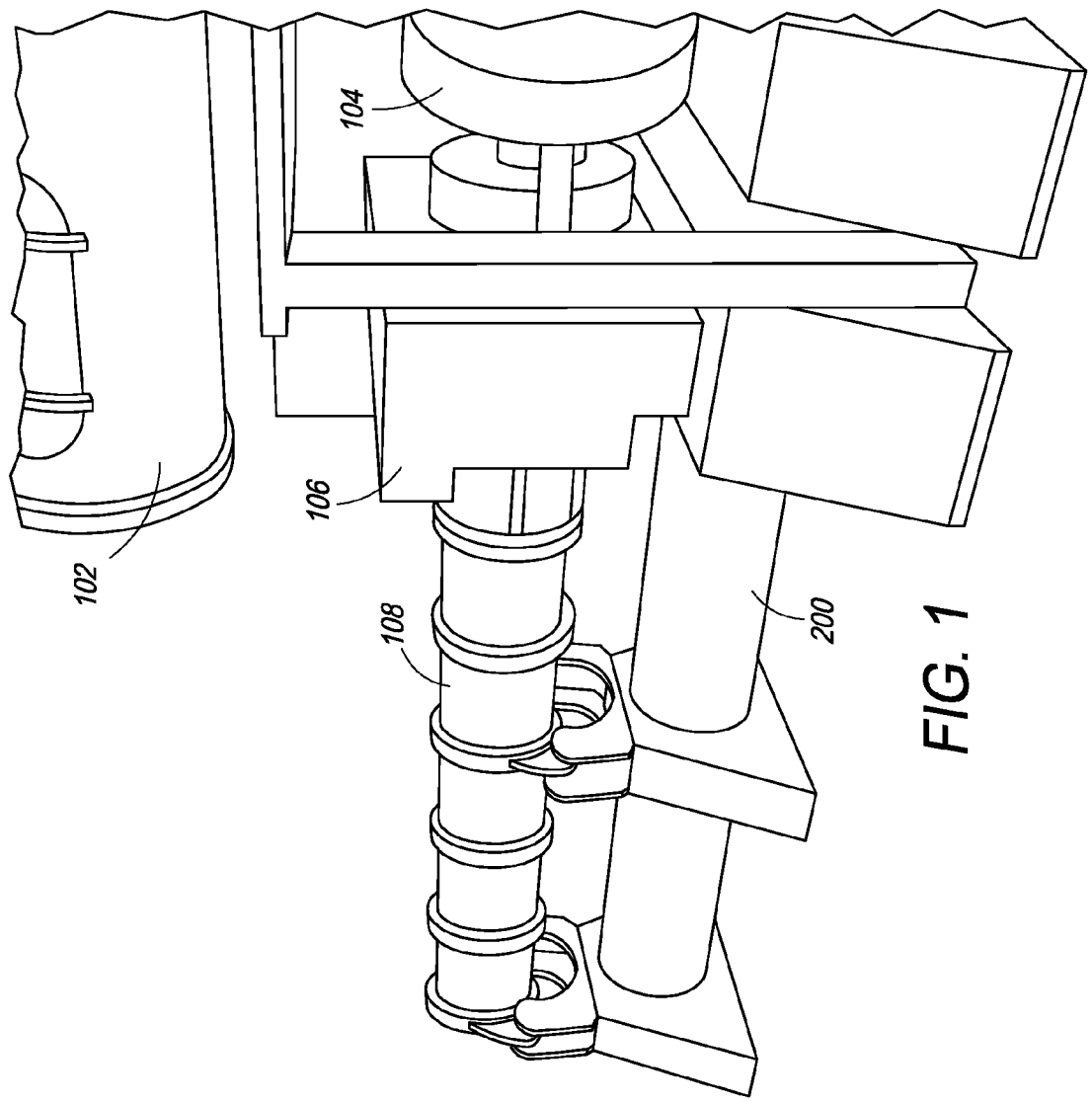
FIG. 1 is an isometric view of the extruder assembly in accordance with a preferred embodiment of the present invention.
Figure 2:
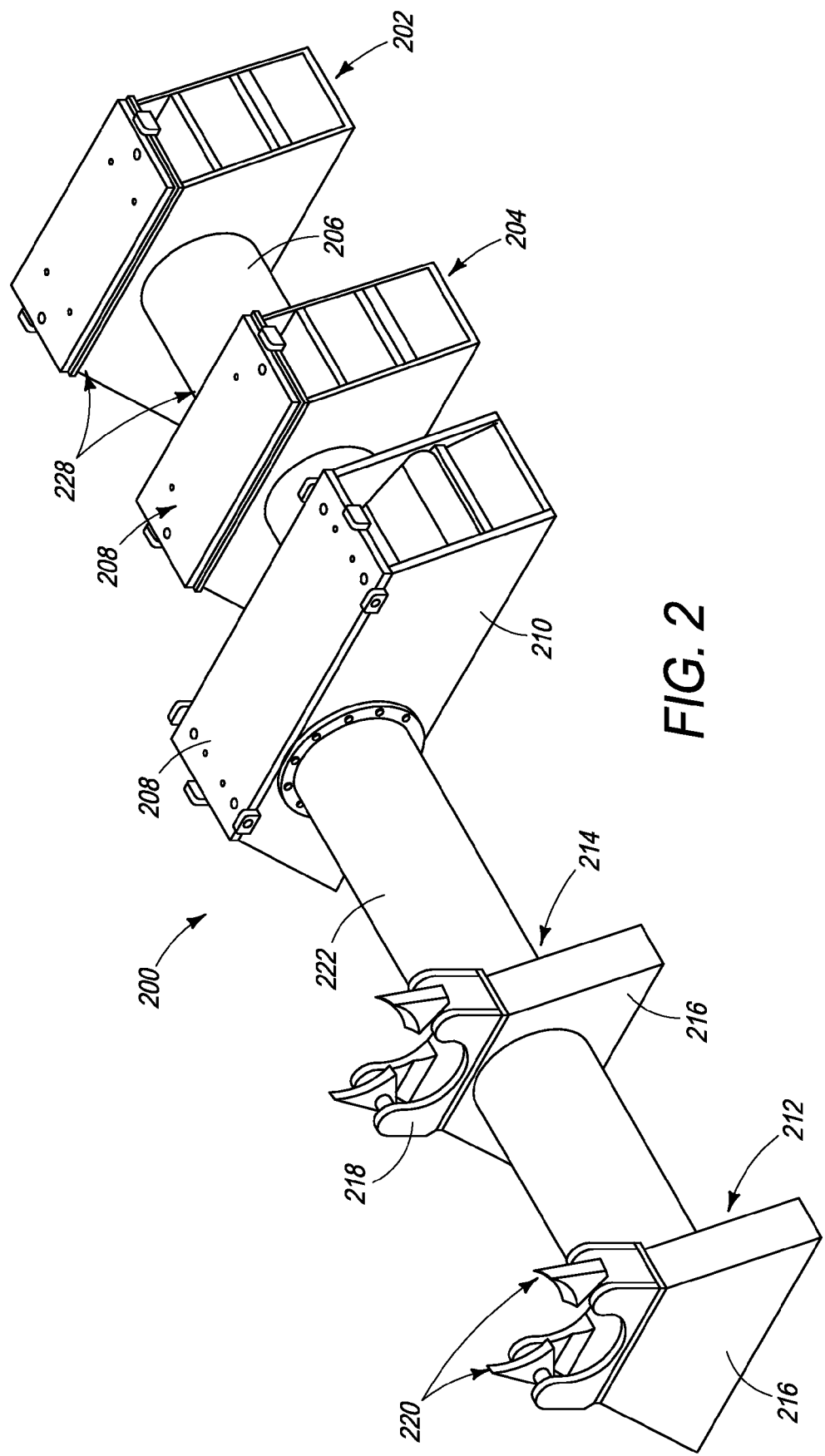
FIG. 2 is an isometric view of the support base for the extruder assembly of FIG. 1.
Figure 3:
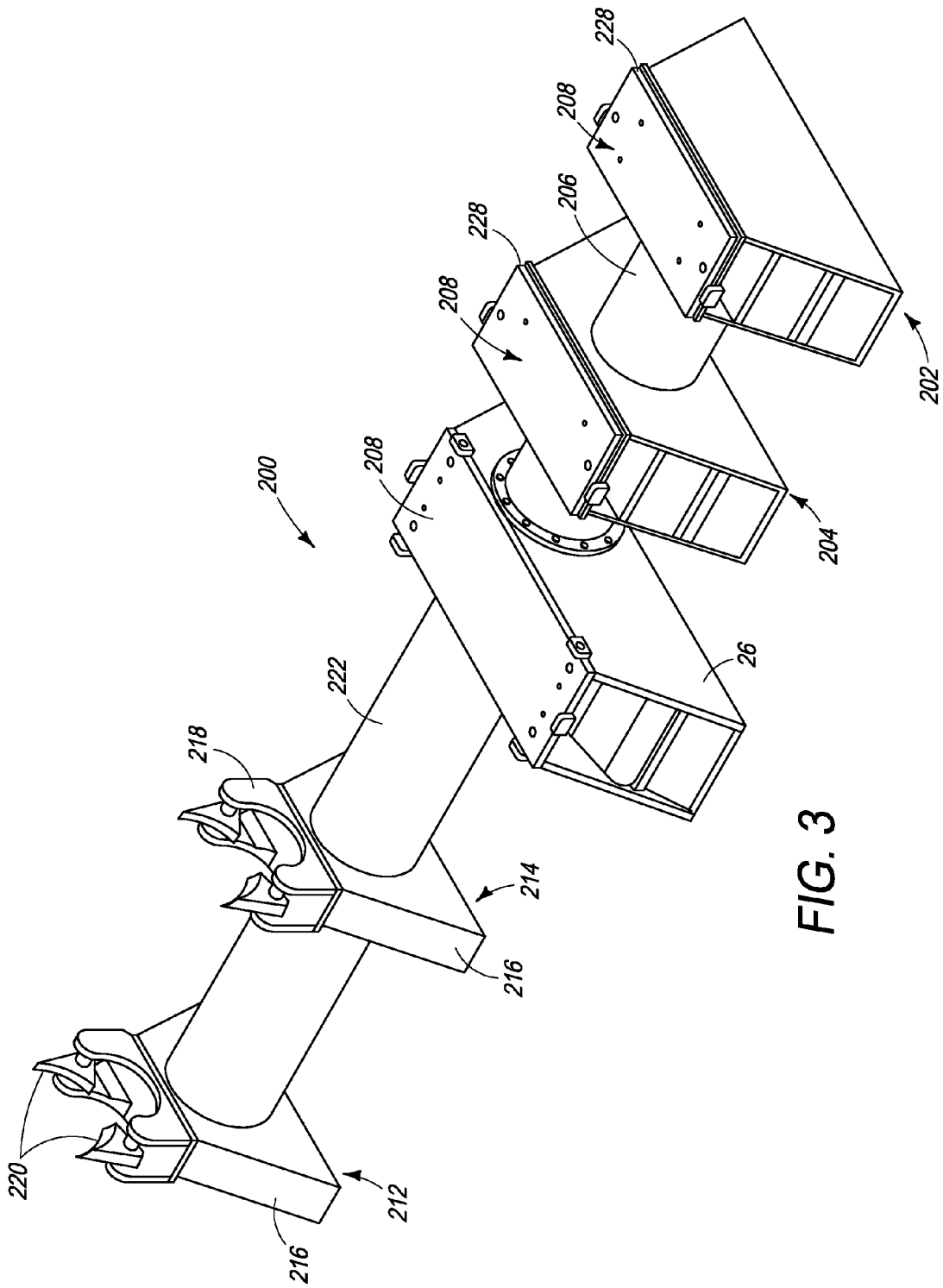
FIG. 3 is another isometric view of the support base for the extruder assembly of FIG. 2.
Figure 7:
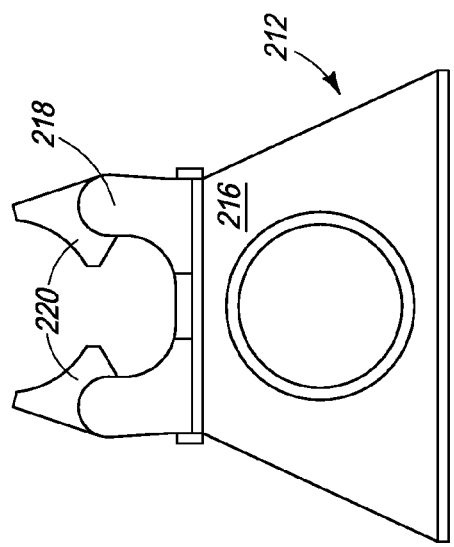
FIG. 7 is an elevation view along section B-B of FIG. 5.
Figure 9:
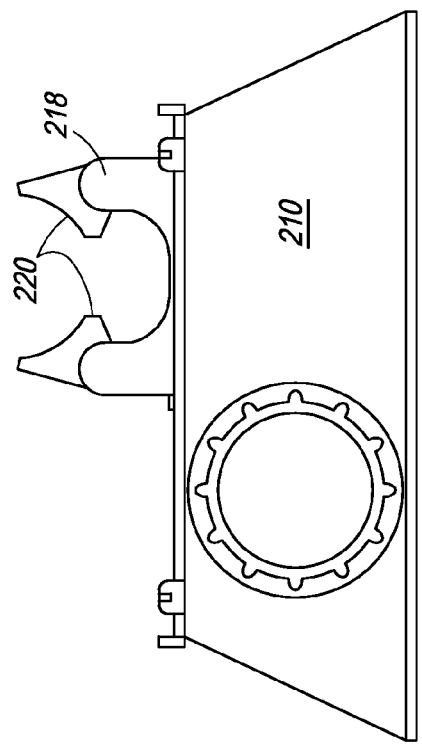
FIG. 9 is an elevation view along section D-D of FIG. 5.
Figure 6:
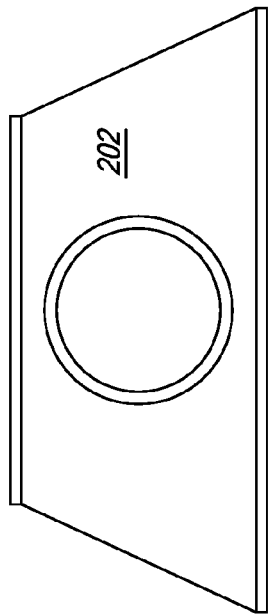
FIG. 6 is an elevation view along section A-A of FIG. 5.
Figure 8:
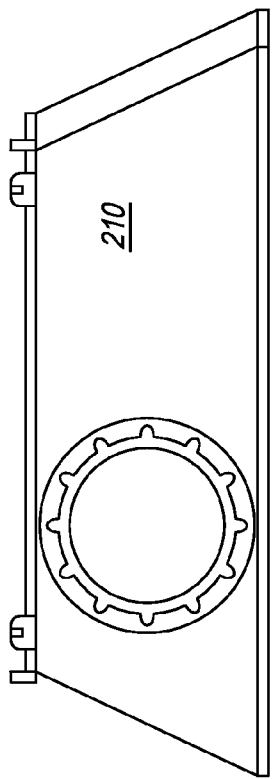
FIG. 8 is an elevation view along section C-C of FIG. 5.

Referring now to the drawings, the depicted elements are, for the sake of clarity, not necessarily shown to scale and like or similar elements are designated by the same reference numeral through the several views.

Extruders have many different uses, but amongst most extruders, there is one commonality; they are heavy. Typically, extruders weigh on the order of several hundred to several tens of thousands of pounds. For each extruder, a base or apparatus of some type is needed to provide a framework for the extruder to rest, together forming a useable assembly.

FIG. 1 shows an extruder assembly 100 in accordance with a preferred embodiment of the present invention. The extruder assembly 100 comprises a supply member 102, a motor 104, a transmission or gearbox 106, an extruder 108, and a modular or support base 200. The supply member 102 is preferably comprised of a hopper 102 containing extrudate that that forces an extrudate into the extruder 108. Powering the assembly 100 is the motor 104. Preferably, the motor 104 can be electric motor. The motor 104 is in mechanical communication with the transmission 106, and the transmission 106 is in mechanical communication with the extruder 108. The transmission 106 is preferably coupled between the motor 104 and extruder 108. Thus, the transmission 106 is able to transfer mechanical work from the motor 104 to the extruder 108. When operating, the extruder 108 is in fluid communication with the supply member 102 and that generates a flow of extrudate.

Turning to FIGS. 2-9, the reference numeral 200 designates, in general, an extruder base assembly or modular base embodying features of a preferred embodiment of the present invention. The extruder base assembly 200 has an overall length of approximately 188¾ inches.

A portion of the extruder base assembly 200 includes a fixed motor support member 202 connected by a linking member 206 to an intermediate support member 210. The first linking member 206 has a first end and an opposite second end. The first end of the first linking member 206 is preferably disposed in a longitudinally centered hole in the side of the fixed motor support member 202, and secured by welding at or near its first end to the fixed motor support member 202. The second end of the first linking member 206 is preferably disposed in the intermediate support member 210 and secured by bolting through a flange (not shown) at or near its second end to the intermediate support member 210. Preferably, the distance between the fixed motor support member 202 and the intermediate support member 210, measured along the length of the first linking member between the most adjacent sides of these support members, can be about 48.872 inches. Also, supporting the motor 104 is a moveable motor support member 204 that may be adjusted or moved to a desired position and welded to the first linking member 206. This support member 204 is preferably located between the fixed motor support 202 and the intermediate support member 210.

The motor support members 202 and 204 each have a mounting surface 208 that can support at least a portion of the motor 104. A plate 228 is attached with bolts to the mounting surface 208 of each motor support member 202 and 204. Additionally, this plate 228 is preferably secured to the motor 104 with bolts before mounting or tightening to the motor supports 202 and 204. The intermediate support member 210 also has a mounting surface 208 that can be adapted to support at least a portion of a transmission 106 that is in mechanical communication with the motor 104. The transmission 106 is typically bolted to the intermediate support member 210.

The extruder base assembly 200 also includes a fixed extruder support member 212, connected by a second linking member 222 to the intermediate support member 210. The second linking member 222 has a first end and an opposite second end. The first end of the second linking member 222 is preferably disposed in a longitudinally centered hole in the side of the fixed extruder support member 212, and secured by welding at or near its first end to the fixed extruder support member 212. The second end of the second linking member 222 is preferably disposed in the intermediate support member 210 and secured by bolting the second linking member 222 to the intermediate support member 210 through a flange (not shown) at or near its second end to the intermediate support member 210. Preferably, the distance between the fixed extruder support member 212 and the intermediate support member 210, measured along the length of the second linking member 222 between the most adjacent sides of these support members, can be about 99.660 inches. Also, extruder 108 can be supported by a moveable extruder support member 214 that may adjusted or moved to a desired position and welded to the second linking member 222. Support member 214 is preferably located between the intermediate support member 210 and the fixed extruder support member 212. Additionally, the extruder support members 212 and 214 each have a mounting surface that can be adapted to support at least a portion of an extruder 108.

Typically, the first and second linking members 206 and 222 are generally cylindrical or tubular with diameters of about 16 inches. The first and second linking members 206 and 222 can each generally have a central axis, 224 and 226.

Both of the linking members 206 and 222, preferably, have one end connected to the intermediate support member 210, but the central axis of the first linking member 224 is preferably spaced apart or displaced about 19.688 inches from the central axis of the second linking member 226, enabling a transmission to transfer mechanical work from the motor 104 to the extruder 108.

Typically, the fixed motor support member 202 and the moveable motor support member 204 can have depths of about 14.920 inches, a generally trapezoidal vertical cross-section with a height of approximately 22.75 inches, and a width at the base of the trapezoid of approximately 53 inches. The intermediate support member 210 can have a depth of about 18 inches, and preferably has a generally trapezoidal vertical cross-section with a height of about 22.183 inches and a width at the base of about 67 inches.

The fixed extruder support member 212 and the moveable extruder support member 214 preferably have lower members 216 with top surfaces (not shown) and generally trapezoidal vertical cross-sections, wherein the lower members 216 engage the second linking member 222. The lower members 216 may have typical depths of 7.25 inches, heights of approximately 21.250 inches, and a width at the base of the trapezoid of approximately 38.935 inches. Carriages 218 may be secured by bolts (not shown) to the top surfaces of the lower members 216 of the fixed and moveable extruder support members 212 and 214. The carriages 218 can have arms 220 that are adapted to engage the extruder 108, and can be hingedly connected to the carriage with a pin system, allowing for the support of many difference size extruders. Preferably, the carriage arms 220 are attached to the extruder heads (not shown) before installing the pin system.

Thus, the base 200 can be set up and adjusted specifically for a given extruder assembly (such as assembly 100). Regardless of the length of extruder, size of the motor, size of the transmission, the dimensions can be adjusted to provide the desired support.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. An apparatus for supporting an extruder assembly, comprising:
   a fixed motor support member having a mounting surface, the mounting surface of the fixed motor support member supporting at least a portion of a motor;
   an intermediate support member having a mounting surface, the mounting surface of the intermediate support member supporting at least a portion of a transmission that is in mechanic communication with the motor;
   a first linking member having a first end and an opposite second end, the first linking member being secured at its first end to the fixed motor support member and at its second end to the intermediate support member;
   a movable motor support member having a mounting surface, the mounting surface of the movable motor support member supporting at least a portion of the motor, wherein the movable motor support member is located between the fixed motor support member and the intermediate member, and
   wherein the movable motor support member movably engages the first linking member;
   a fixed extruder support member having a mounting surface, the mounting surface supporting at least a portion of an extruder that is in mechanical communication with the transmission;
   a second linking member having a first end and an opposite second end, the second linking member being secured at its first end to the fixed extruder support member, and the second linking member being secured at its second end to the intermediate support member; and
   a movable extruder support member having a mounting surface, the mounting surface of the movable extruder support member supporting at least a portion of the extruder, wherein the movable extruder support member being located between the fixed extruder support member and the intermediate support member, and wherein the movable extruder support member movably engages the second linking member.

2. The apparatus of claim 1, wherein the first and second linking members are generally cylindrical.

3. The apparatus of claim 1, wherein the first and second linking members each have a central axis.

4. The apparatus of claim 3, wherein the central axis of the first linking member is spaced apart from the central axis of the second linking member.

5. The apparatus of claim 1, wherein the fixed motor support member and the movable support member have a generally trapezoidal vertical cross-section.

6. The apparatus of claim 1, wherein the intermediate support member has a generally trapezoidal vertical cross-section.

7. The apparatus of claim 1, wherein the fixed extruder support member and the movable extruder support member further comprise:
   a lower member having a top surface and a generally trapezoidal cross-section, wherein the lower member engages the second linking member; and
   a carriage secured to the top surface of the lower member, the carriage having arms that are adapted to engage the extruder.

8. An assembly, comprising:
   a supply member having an extrudate disposed therein;
   an extruder that is in fluid communication with the supply member and that generates a flow of the extrudate;
   a motor;
   a transmission coupled between the extruder and the motor;
   a fixed motor support member having a mounting surface, the mounting surface of the fixed motor support member supporting at least a portion of the motor;
   an intermediate support member having a mounting surface, the mounting surface of the intermediate support member supporting at least a portion of the transmission;
   a first linking member having a first end and an opposite second end, the first linking member being secured at its first end to the fixed motor support member at its second end to the intermediate support member;
   a movable motor support member having a mounting surface, the mounting surface of the movable motor support member supporting at least a portion of the motor, wherein the movable motor support member is located between the fixed motor support member and the intermediate member, and wherein the movable motor support member movably engages the first linking member;

a fixed extruder support member having a mounting surface, the mounting surface supporting at least a portion of the extruder;

a second linking member having a first end and an opposite second end, the second linking member being secured at its first end to the fixed extruder support member, and the second linking member being secured at its second end to the intermediate member;

and a movable extruder support member having a mounting surface, the mounting surface of the movable extruder support member supporting at least a portion of the extruder, wherein the movable extruder support member being located between the fixed extruder support member and the intermediate support member, and wherein the movable extruder support member movably engages the second linking member.

9. The apparatus of claim 8, wherein the first and second linking members are generally cylindrical.

10. The apparatus of claim 8, wherein the first and second linking members each have a central axis.

11. The apparatus of claim 10, wherein the central axis of the first linking member is spaced apart from the central axis of the second linking member.

12. The apparatus of claim 8, wherein the fixed motor support member and the movable support member have a generally trapezoidal vertical cross-section.

13. The apparatus of claim 8, wherein the intermediate support member has a generally trapezoidal vertical cross-section.

14. The apparatus of claim 8, wherein the fixed extruder support member and the movable extruder support member further comprise:

a lower member having a top surface and a generally trapezoidal cross-section, wherein the lower member engages the second linking member; and a carriage secured to the top surface of the lower member, the carriage having arms that are adapted to engage the extruder.

* * * * *